Nov. 15, 1932.  O. L. VINCENT  1,888,057
AUTOMATIC GATE
Filed March 19, 1931
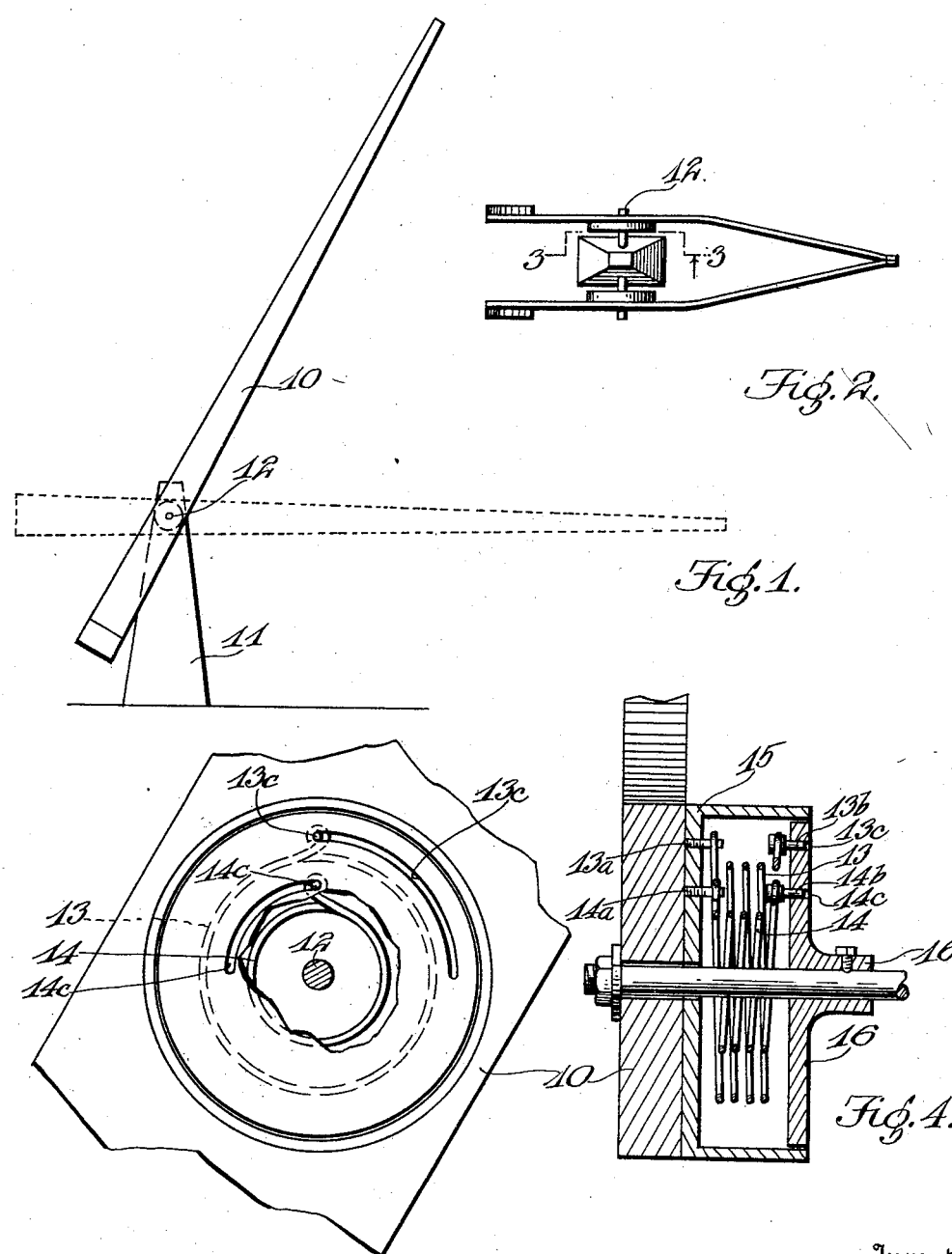

Patented Nov. 15, 1932

1,888,057

UNITED STATES PATENT OFFICE

ORVILLE L. VINCENT, OF CHICAGO, ILLINOIS

AUTOMATIC GATE

Application filed March 19, 1931. Serial No. 523,908.

My invention relates to automatic gates for crossings, highways, and other places where temporary barriers are desirable, and my main object is to provide a gate which yields to interruptions or impediments in case they arise when the gate commences or undergoes its operation.

A further object of the invention is to so construct the novel gate as to suffer no damage when interrupted by any cause or object in the course of its movement.

Another object of the invention is to provide a simple and compact mechanism between the driving element and the gate for the latter to accomplish the objects previously referred to.

An additional object of the invention is to incorporate in the improved gate a resilient unit which makes the gate yield for the utmost safety to life and property and freedom from injury to the gate or its driving mechanism.

A final but nevertheless important object of the invention is to design the novel gate with a unit for attaining the above objects which is independent from and extrinsic of the gate operating unit.

With the above objects in view and any others that may suggest themselves from the specification and claims to follow, a better understanding of the invention may be had by reference to the accompanying drawing, in which—

Fig. 1 is an elevation of a typical automatic gate in the poised or normal position, finely dotted lines indicating the position of the gate as lowered;

Fig. 2 is a plan view of Figure 1;

Fig. 3 is a magnified section on the line 3—3 of Figure 1, and partly broken away; and Fig. 4 is a cross section of Figure 3.

While automatic gates for highways or crossings are well known, it is a significant fact that many are not sufficiently safe when meeting an impediment, such as a vehicle passing under the gate as it is lowered, and that they are not proof to injury when through some cause a gate is held or detained when its mechanism acts to start it on its movement. It has therefore been my intention to provide a gate which has sufficient flexibility to allow for the eventualities referred to without endangering the safety to life or objects or working damage upon its own mechanism.

By specific reference to the drawing, the gate is indicated at 10, being mounted upon a standard 11 in which its working mechanism is contained, the gate operating shaft of the latter projecting on both sides as indicated at 12 to receive the arms of the gate. In a general sense, this is a standard or typical gate assembly for which I claim no novelty.

Instead of mounting the gate fast on the shaft 12, I merely dispose it free for rotary motion thereon, connecting the shaft for the transmission of motion to the gate by the agency of two coil springs 13 and 14. These are preferably made with laterally grouped coils as shown, and are disposed within one another for compactness of arrangement. Each gate arm is secured on its inner side to a cup-shaped housing 15, which is centrally bored as is the gate to freely ride on the shaft 12. This housing serves as an enclosure for the springs and receives a closure disk 16 on the inner and open end, such end being slightly spaced from the periphery of the disk in order to be free thereof. The disk is extended outwardly with a hub 16a fast on the shaft 12.

The outer wall of the housing 15 has radially spaced and inwardly projecting pins 13a and 14a, these receiving the outer ends of the respective springs 13 and 14. The inner ends of the springs carry pins 13b and 14b, respectively, and project into slots 13c and 14c made in the disk 16. These slots are not only radially spaced as the pins 13b and 14b, but are of arcuate formation, approximately the length of a quadrant and in immediate rotary succession. The springs are wound in directions opposite to one another and are sufficiently firm to draw positively upon the gate when the shaft is turned, it being understood that the gate is sufficiently light to permit this action.

By reference to Figure 3, it will be seen that the spring 13 terminates in the left hand end of the slot 13c, while the spring 14 terminates in the right hand end of the slot 14c. Considering the gate in poised position, as per full lines in Fig. 1, the rotation of the shaft 12 in a clockwise direction will cause the disk 16 to draw on the spring 13 in a winding direction. Since the gate yields to the pull of the spring, as previously mentioned, the motion of the shaft will not further wind the spring but draw the same and induce the lowering of the gate. During the motion of the disk just described, the spring 14 will not be affected in any manner, as the slot 14c will clear the end of the spring 14 during the motion of the disk. The usual travel of a gate of this kind is 70 degrees, indicating that the slots 13c and 14c are of extra length to provide even more clearance than is required.

Assume that the gate is down, as per dotted lines in Fig. 1, the mechanism of the shaft 12 may be actuated to reverse the motion of the shaft for the raising of the gate. In this event the shaft will turn counter-clockwise, and the end of the spring 14 will be urged by the disk to procure the raising of the gate, while the end of the spring 13 is cleared by the slot 13c, this action being exactly the reverse of the former one. Thus, the normal operation of my improved gate is evident.

With the gate in poised position, it is possible that some object is in the way of its lowering motion, or some one may choose to tamper or interfere with the automatic action of the gate. In this event, the motion of the shaft will proceed as before, but the retention of the gate will cause the disk 16 to draw upon the spring 13 in a winding course, this action continuing until the motion of the shaft is automatically stopped after the shaft has had a number of turns corresponding to the usual travel of the gate. Thus, the mechanism for operating the shaft has not suffered any setback or undue strain, since the winding of the spring through 70 degrees is a matter of little effort and easily within the power of the shaft operating mechanism. Conversely, should the gate become so involved with a passing vehicle that it cannot again rise after it is lowered, the same action will result in a reverse direction and with like results. Whatever may impede the gate on the down course or up course, no injury will be caused to the impeding person or object because the gate yields to the impediment and the power for operating the gate takes its course without a positive effect upon the gate. To repeat, the period or course of the power action is so brief, that the power automatically shuts off before the gate can strike or impinge upon any impediment to the slightest harmful degree.

It is thus seen that I have provided a gate which has a high safety factor and is foolproof, so to speak. Owing to the novel connection between the power element and the gate, it is not necessary to make the latter heavy, as in many existing types, so that the said connection can be fairly light and so compactly housed as to be practically unnoticeable. The device is also of utmost simplicity, since it contains but two working parts between the power element and the gate.

While the use of springs is frequently looked upon with disfavor from an engineering point of view, it should be observed in the present instance that my springs are normally a positive connection and under no appreciable tension as the gate is operated under normal conditions, unlike the springs in a scale or automobile engine, which are constantly being tensioned. Thus, the limited amount of tension that may be imparted to either of my springs only occurs in cases of emergency, accident or possible unauthorized handling or tampering, and it may be safely assumed that with the springs properly tempered and packed in grease, they will serve for unusually long periods without attention, adjustment or even the danger of breakage, representing an ample measure of safety and economy.

I claim:—

1. A highway gate including a drive shaft on which the gate is mounted for free rotary motion, a disk carried by the shaft opposite the gate, a coil spring disposed about the shaft, one end of the spring being connected to the gate and the other end to the disk, and a second coil spring arranged concentrically of the first and similarly connected, the second spring being wound in reverse direction to the first.

2. The structure of claim 1, said disk being arcuately slotted where the spring ends connect with it to permit a free rotary motion of the disk relative to such ends to a limited extent.

3. The structure of claim 1, said disk being arcuately slotted where the spring ends connect with it to permit a free rotary motion of the disk relative to such ends to a limited extent, and the slots extending beyond the respective spring ends in courses substantially concentric with the springs.

4. The structure of claim 1, said disk being arcuately slotted where the spring ends connect with it to permit a free motion of the disk relative to such ends to a limited extent, such spring ends being in radial alinement, and the slots extending in rotary succession from the line of the ends.

5. A highway gate including a drive shaft on which the gate is mounted for free rotary motion, a drum housing carried by the gate about the shaft, an end-closure for the housing secured on the shaft, and free of the housing, and a coil spring about the shaft and with its ends connected respectively to the housing and the end-closure.

6. A highway gate including a drive shaft on which the gate is mounted for free rotary motion, a drum housing secured with its closed end to the gate and having the other end open, said housing being disposed about the shaft, a closure for the other end of the housing and free of the latter, said closure being fast on the shaft, and a coil spring about the shaft and with its ends connected respectively to the housing and the end-closure.

7. In a highway gate of the character described, the combination of a supporting member, a rotatable horizontally extending shaft supported by said member, a gate carried by the shaft and arranged to swing vertically into and out of a substantially horizontal position across the highway in response to rotation of the shaft, and a driving connection between the shaft and the gate consisting of a coil spring around the shaft and connected to the gate so as to transmit the drive and raise the gate when the shaft is rotated in one direction, and a second and similarly constituted coil spring around the shaft connected to the gate so as to swing the latter downwardly when the shaft is rotated in the opposite direction.

In testimony whereof I affix my signature.

ORVILLE L. VINCENT.